Patented Mar. 5, 1929.

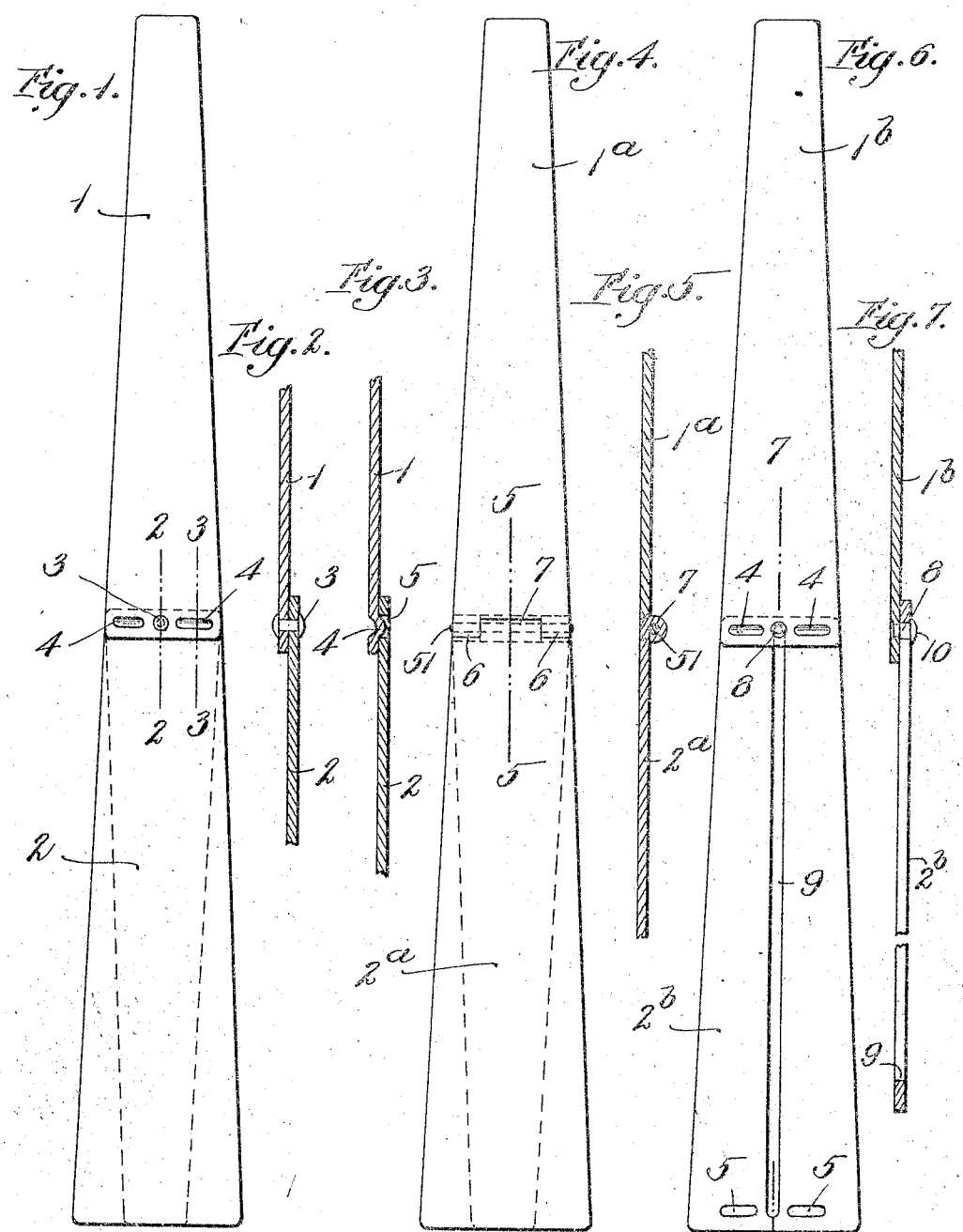

1,704,081

UNITED STATES PATENT OFFICE.

COSMO DRAMIS, OF BOSTON, MASSACHUSETTS.

FORM FOR SHAPING TIES.

Application filed February 9, 1927. Serial No. 166,834.

My invention relates to forms for use in shaping neckties and the like and it has for its object to provide an improved form of the kind referred to. Heretofore, I have constructed a form for shaping neckties and the like consisting of a single piece of sheet material, such as sheet metal, that was made longitudinally tapering in width, said form being adapted to be inserted within a necktie so as to distend and shape the latter. As heretofore constructed, this form was made to consist of a single piece of sheet material about twenty or twenty-two inches long and, consequently, it was a matter of some inconvenience to store or transport the same. Therefore, by my present invention I have produced a form for shaping neckties consisting of sections or members connected together so that they are movable relatively whereby they may be adjusted so as to occupy either a distended end to end relationship or a collapsed relationship where the members are disposed side by side. In the best form of my invention two sections or members are provided of approximately the same length so that when the device is in collapsed condition it occupies approximately one-half of the space that it occupies when in extended condition.

Other features of my invention are hereinafter pointed out.

In the accompanying drawings:

Figure 1 is an elevation of a form for use in shaping neckties that is constructed in accordance with my invention.

Figure 2 is a section on line 2—2 of Fig. 1.

Figure 3 is a section on line 3—3 of Fig. 1.

Figure 4 is an elevation of another form of my invention.

Figure 5 is a section on line 5—5 of Fig. 4.

Figure 6 illustrates a third form of my invention.

Figure 7 is a section on line 7—7 of Fig. 6.

As shown in Figure 1 my improved form comprises two half members 1 and 2 made from sheet metal or other appropriately stiff sheet material and each of these members is made tapering in width longitudinally. The member 2 which constitutes the butt member of the structure has its narrower end loosely pivoted by a rivet 3 to the wider end of the member 1 which constitutes the tip member of the structure thus allowing the tip member to be swung on the rivet 3 so as to occupy either a position alongside the butt member 2, as indicated by dotted lines in Fig. 1, or so as to occupy the extended full line position where the two members are in alignment approximately end to end. As shown in the drawings the end portions of the two members 1 and 2, which are joined by the pivotal rivet 3, are of substantially the same width and from this joint the member 1 narrows gradually in width toward its free end while the member 2 increases gradually in width toward its free end. Thus the butt or outer end of the form is relatively wide and said form tapers progressively, and more or less uniformly, toward the free end of the member 1.

In order to hold the two members 1 and 2 in extended relationship the inner side of the member 1 where it laps over upon the member 2 is made with rounded bosses 4 which, when the two members are in extended relationship, occupy holes or recesses 5 provided in the adjacent portion of the member 2. By grasping the two members 1 and 2, one in one hand and the other in the other, the bosses 4 can be swung into and out of the holes 5. When they occupy the holes 5 they serve to yieldingly, yet securely, hold the two members against accidental pivotal displacement on the axis of the rivet 3. It will also be clear that when the tip member 1 is swung down into position alongside of the butt member 2, the bosses 4 will again spring into the holes 5 and lock the two members in that position.

In the form of my invention, shown in Fig. 4, the butt and tip members 1ª and 2ª are connected together by a transverse hinge joint including a pintle 51 and eyes 6 and 7 provided at the abutting ends of the two members 1ª and 2ª. With this form of my invention the two members are folded together or apart by swinging movement on a transverse axis, that is, an axis parallel with the plane of the two sheet metal members, whereas in the form shown in Fig. 1, the two members move relatively on an axis at right angles to the plane of the latter.

The form of my invention illustrated in Figs. 6 and 7 includes a stud 8 constituting a rigid part of the tip member 1ᵇ, said stud occupying a slot 9 extending longitudinally of the butt member 2ᵇ and being held therein by a head 10 provided at the outer end of said stud. In this form of my invention the device is collapsed and extended by relative endwise movement of the two members and the member 1ᵇ may, as shown, be provided with bosses 4 co-operating with two pairs of holes 5 formed in the member 2ᵇ at the opposite ends thereof to lock the two members in extended and collapsed relationship, said bosses 4 springing into and out of the holes 5 when the two members are forcibly moved endwise relatively to the limits of slot 9.

To use the above described device the two members are placed in extended relationship after which the smaller end of the form is inserted into the tubular necktie and the form shoved into the latter as far as it will go. If the tie is left in this position on the form for a length of time its wrinkles will become obliterated and this ironing effect may be hastened by slightly dampening the tie after placing it upon the form, or by ironing it.

What I claim is:

1. A tapered form for use in shaping neckties, said form being of thin sheet material and comprising two members which are smooth and flat and adapted to form a support for a tie while it is being shaped, said members normally being approximately end to end, a stud projecting from one member into an opening in the other, said stud uniting said members to permit them to be moved relatively until one member is superposed on the other, one of said members having a socket at each side of the stud, and the other member having a pair of projections cooperable with said sockets whereby releasably to lock the members against relative movement.

2. A tapered form for use in shaping neckties, said form being of thin sheet material and comprising two elongate members each having a smooth flat surface for supporting the material of a necktie while the tie is being pressed, said members being normally approximately end to end, means uniting said members so as to permit them to move relatively until one overlies the other, and a projection on one of said members engageable alternatively with either of two openings in the other member whereby releasably to lock said members in end to end or superposed relation respectively.

3. A form for use in shaping neckties, said form being of thin sheet material and tapering in width from one end toward the opposite end, said form comprising two elongate members which are normally substantially aligned, one of said members being movable to a position where it overlies the other, a stud projecting from one of said members into an opening in the other for uniting them, and means for releasably locking said members in either of two relative positions.

4. A form for use in shaping neckties, said form being of thin sheet material having a smooth and rigid surface, said form comprising two elongate members which are normally substantially aligned, the members overlapping at their adjacent ends, a stud connecting said members to permit them to be moved relatively until one overlies the other, and a projection on one of said members engageable with a socket in the other for releasably locking them in their normal substantially aligned position.

Signed by me at Boston, county of Suffolk and State of Massachusetts, this 1st day of February, 1927.

COSMO DRAMIS.